Nov. 25, 1941.  J. A. CLEMENS  2,263,798
CAPTIVE FASTENER
Filed April 28, 1938
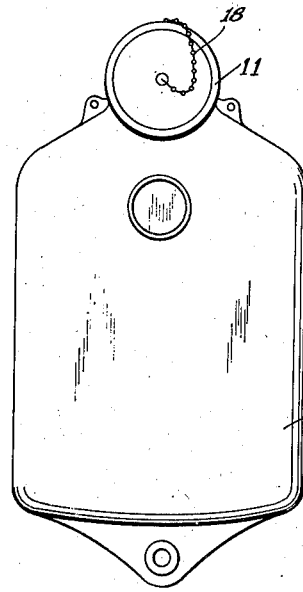
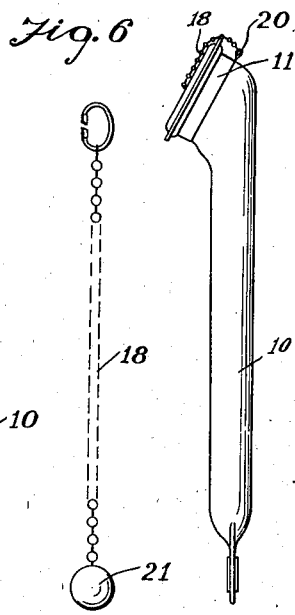
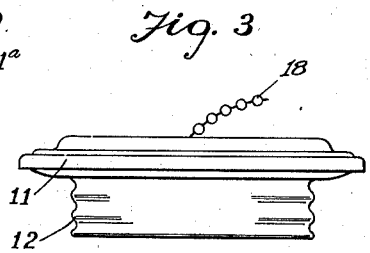
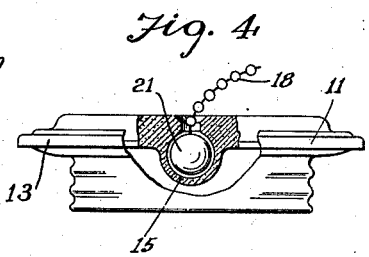
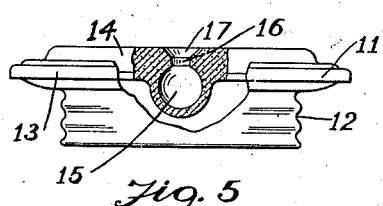
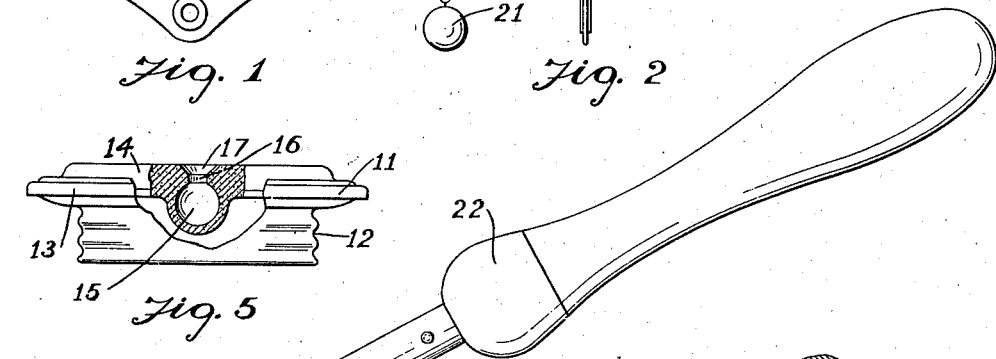
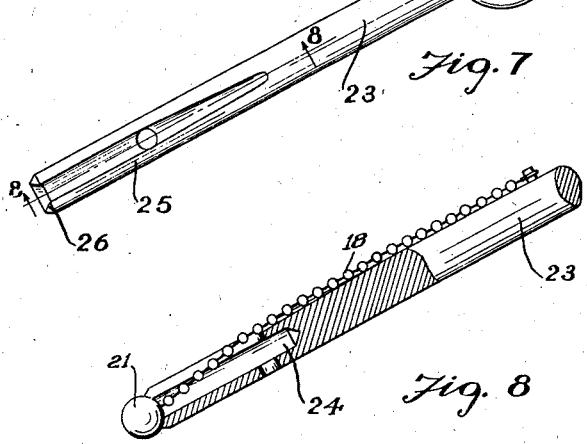
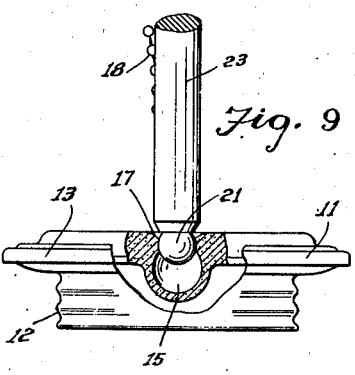
INVENTOR
John A. Clemens
BY Nathaniel Frucht
ATTORNEY Patented Nov. 25, 1941

2,263,798

UNITED STATES PATENT OFFICE 2,263,798

CAPTIVE FASTENER

John A. Clemens, Providence, R. I., assignor to Davol Rubber Company, a corporation of Rhode Island Application April 28, 1938, Serial No. 204,879

1 Claim. (Cl. 150—8)

My present invention relates to the manufacture of rubber articles, and has particular reference to captive metallic fasteners to rubber articles.

It is the principal object of my invention to provide a novel lock for securing metal retainers, such as a chain or the like, to rubber articles, such as a cap for a hot water bottle.

It is a further object of my invention to lock the metal retainer to the rubber article so as to entirely conceal the locking arrangement.

Another object of my invention is to provide a secure lock against accidental separation, which utilizes the resilience of the rubber as the retaining force, whereby separation may be effected if desired.

With the above and other objects and advantageous features in view, my invention consists of a novel arrangement of parts more fully disclosed in the detailed description following, in conjunction with the accompanying drawing, and more specifically defined in the claim appended thereto.

In the drawing:

Fig. 1 is an elevation of a hot water bottle and cap, to which my invention is illustratively applied;

Fig. 2 is a side elevation thereof;

Fig. 3 is an enlarged view of the cap;

Fig. 4 is a view similar to Fig. 3, parts being broken away;

Fig. 5 is a view similar to Fig. 4, the metal retainer being removed;

Fig. 6 is a view of the metal retainer;

Fig. 7 is a perspective view of a preferred joining tool;

Fig. 8 is a sectional detail showing the mounting of the retainer for securing; and Fig. 9 is a view similar to Fig. 5, showing the securing step.

It has been found desirable to lock a metallic retainer chain to a rubber article, such as a cap or the like, without breakage or strain on the rubber, and without outward disclosure of the locking arrangement. I have devised a construction which utilizes the natural resilience of the rubber, by forming a cavity in the rubber having a narrow neck, and then forcing an enlarged end of the metallic chain through the narrow neck into the cavity, whereby a secure lock is obtained. I have found it preferable to form the cavity of generally spherical contour, and the enlarged end as spherical and somewhat smaller than the cavity whereby a universal connection is obtained, thus relieving strain due to twisting or turning of the metallic chain with respect to the rubber article.

Referring to the drawing, the hot water bag 10 has a detachable cap 11, the cap having a metal shell 13 which is preferably threaded as indicated at 12 to threadedly engage the correspondingly threaded metallic neck 11 of the bag 10. The shell 13 has a rubber top 14 secured therein by any suitable means, as by spinning or the like, provided with a cavity 15 having a narrow neck 16 and a conical entrance passage 17. A metallic chain 18 is provided, having a lock ring 19 at one end for attachment to a suitable retainer element 20 on the metallic neck 11a, and a ball 21 at the other end for locking in the cavity 15, whereby a captive cap arrangement results.

It is preferred to use a joining tool 22, see Fig. 7, having a metallic tip 23 which has an end bore 24 and a side wall slit 25, the tip end 26 being preferably concave or conical, whereby the ball 21 may be seated on the tip end and the chain 18 then passed through the bore 24 and out of the slit 25, thus enabling the operator to firmly grasp the handle of the joining tool and the end of the chain and to thrust the ball past the yielding neck 16 into the cavity 15, see Figs. 9 and 4.

The ball is now retained in the cavity by the resilience of the rubber sides of the neck 16, and the cap becomes a captive cap which cannot be separated or lost from the bag. There are no outward visible lock means, whereby a finished product results. If the ball is large enough to be gripped by the cavity walls, a firmer lock is obtained; if it is somewhat loose in the cavity, a universal connection results.

Although I have described a specific constructional embodiment of my invention, it is obvious that the principles thereof may be applied to the locking of a retainer element or chain to any article having resilience, and that the cavity, size and contour, the material and shape of the retainer, and the size and contour of the retainer end, may be changed to suit the requirements for different articles, designed for other purposes, without departing from the spirit and the scope of the invention as defined in the appended claim.

I claim:

A stopper for hot water bottles and the like, comprising a hollow metal body portion of cylindrical shape having its outer wall threaded and having an upper flange portion projecting laterally from the cylindrical portion and shaped to lockingly receive a top closure disc, said disc having a central generally spherical depending socket and a constricted neck opening of narrow width having yieldable resilient walls and communicating with said socket, and a chain having a spherical ball swivelly connected to one end and seated in said spherical socket, said ball being of a size to substantially fill said socket and of a diameter greater than said neck opening, whereby said spherical end, after being forced through the resilient walls of said neck opening, is permanently retained in said socket against accidental removal.

JOHN A. CLEMENS.